W. H. KELLY.
Wooden Wares.

No. 152,233. Patented June 23, 1874.

Witnesses:
Chas L. Whitman
H. A. Daniels

Inventor:
William H. Kelly
By W. Burris Atty.

AM. PHOTO-LITHOGRAPHIC CO. N.Y. (OSBORNE'S PROCESS.)

UNITED STATES PATENT OFFICE

WILLIAM H. KELLY, OF TERRE HAUTE, INDIANA.

IMPROVEMENT IN WOODEN WARES.

Specification forming part of Letters Patent No. 152,233, dated June 23, 1874; application filed October 30, 1873.

*To all whom it may concern:*

Be it known that I, WILLIAM H. KELLY, of Terre Haute, in the county of Vigo and State of Indiana, have invented certain new and useful Improvements in Wooden Ware; and I do hereby declare the following to be a full, clear, and exact description of the invention, such as will enable others skilled in the art to which it pertains to make and use it, reference being had to the accompanying drawings, which form part of this specification, in which—

Figure 1:
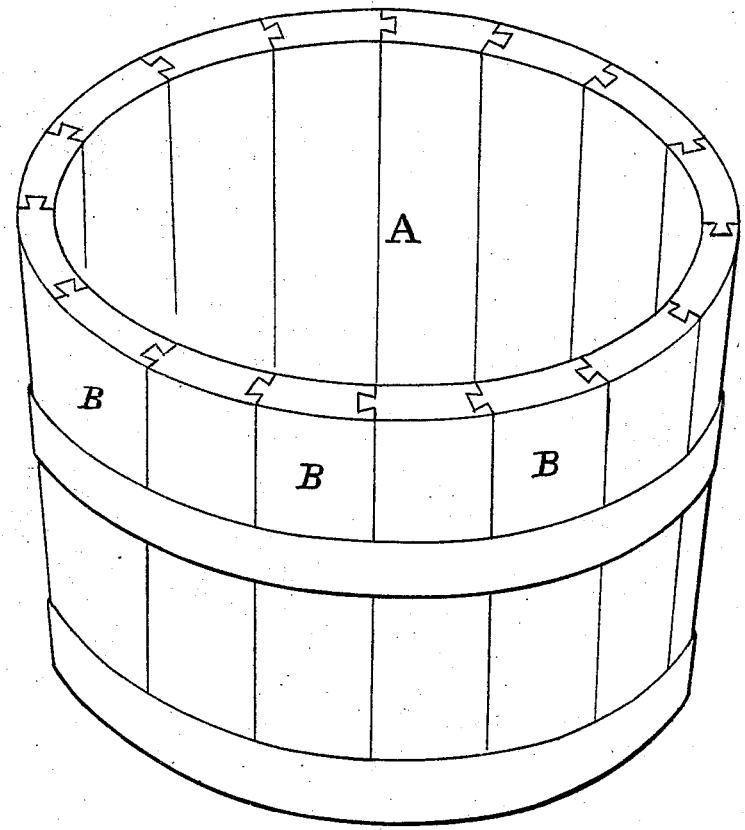
Figure 2:
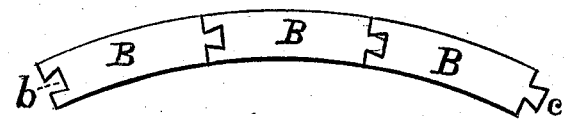

Figure 1 is a perspective view of a wooden vessel, made of staves, joined together by dovetailed tongues and grooves. Fig. 2 is an end view of several of the staves joined together by the dovetailed tongues and grooves.

My invention relates to wooden hollow ware; and consists of such ware made of staves, joined together by dovetailed tongues and grooves, which hold the staves together, and form a vessel which will stand without hoops or other support, thus facilitating the manufacture of the ware, and preventing the liability of its falling in pieces when the hoops which are used to strengthen it become loose and fall off.

A represents a wooden vessel made of staves B, each stave having a dovetailed groove, *b*, on one edge, and a dovetailed tongue, *c*, on the other edge, as shown in the drawings. The tongues are made to fit the grooves loosely, and the staves are joined together by introducing the tongues into the grooves at the ends of the staves, and sliding them in till the ends are even. The edges of the staves are jointed and beveled, and the tongues and grooves formed on them at the same time, and by one and the same adjustable machine, made expressly for that purpose; and the bevels and inclinations of the tongues and grooves are varied to form different-sized vessels, so that the inside and outside joints will fit neatly, as shown in the drawings. The tongues and grooves are made to fit sufficiently loose to allow, with the spring of the wood, the vessel to open enough to insert the bottom, which is introduced at the top and pressed downward by hand or machinery till it springs to its place. The insertion of the bottom thus requires the opening of each joint only a very little more than the yielding of the wood will allow, and the elasticity of the wood causes it to soon spring back, firmly holding the bottom in place, and nearly closing the joints. The looseness of the joints need be scarcely more than sufficient to allow the tongues to be readily inserted in the grooves, and not sufficient to at all affect the operation of the dovetails in holding the vessel together, and preventing its liability of falling in pieces when the hoops are not on.

This ware is more readily set up than that made in the ordinary way, because when the staves are placed in position they require no support to hold them together before the hoops are placed on the vessel; and when in use the hoops which are employed to strengthen the vessel may become loose and fall off, the dovetailed tongues and grooves still hold the staves together, preventing the vessel from falling in pieces.

What I claim, and desire to secure by Letters Patent, is—

As an article of manufacture, a wooden vessel, A, constructed of staves joined together by dovetailed tongues and grooves, substantially as described and shown.

In testimony that I claim the foregoing I have hereunto set my hand this 8th day of October, 1873.

WILLIAM H. KELLY.

Witnesses:
 EDM. F. BROWN,
 W. BURRIS.